UNITED STATES PATENT OFFICE.

ELWIN PATTEN, OF WATERVILLE, AND FREMAN L. EMERY, OF BENTON, MAINE.

COMPOUND FOR WELDING STEEL.

SPECIFICATION forming part of Letters Patent No. 249,393, dated November 8, 1881.

Application filed June 23, 1881. (Specimens.)

*To all whom it may concern:*

Be it known that we, ELWIN PATTEN and FREMAN L. EMERY, the former residing at Waterville, county of Kennebec, and State of Maine, and the latter at Benton, same county and State, both citizens of the United States, have invented certain new and useful Improvements in Compounds for Welding Steel; and we do hereby declare the following to be a full, clear, and exact description of the invention, such as will enable others skilled in the art to which it appertains to make and use the same.

Our invention relates to compounds for welding and refining steel; and the object of our invention is to find a substance which, while it has superior welding properties, will at the same time improve the quality of the steel.

Our compound consists of a combination of ingredients which, when mixed together and used on steel in the usual manner, has a remarkable refining effect, and at the same time makes a superior weld.

In making our compound, we take nine parts of ground gypsum or common plaster and mix it thoroughly with one part of common salt. This preparation we use in working and welding steel, in the same manner as borax is generally used, and it is designed as a substitute for, and an improvement on, borax.

Among the advantages of our compound over borax are the following, viz: It makes a surer and a better weld than borax; it refines steel of whatever grade; it restores steel which has been overheated, and allows the steel to be heated much hotter than ordinarily without any damaging effect; and, finally, it is much cheaper.

The proportions of the compound may be varied considerably, but the great bulk of it should consist of gypsum, which is the element having the beneficial effect upon the steel. The addition of the salt is made in order to make the gypsum flow more freely over the surface of the steel. Other substances than salt may be used in combination with the gypsum for this purpose. The gypsum alone will do good work, but the salt renders it more easy to work with.

The compound may be used for welding iron as borax is now used.

We claim—

A new compound for welding steel, consisting of nine parts of ground gypsum and one part of common salt, substantially as and for the purpose set forth.

In testimony whereof we affix our signatures in presence of two witnesses.

ELWIN PATTEN.
FREMAN L. EMERY.

Witnesses:
S. W. BATES,
H. W. STEWART.